Feb. 2, 1954

N. C. BREMER

SILENT CHAIN 2,667,791

Filed Dec. 23, 1950

7 Sheets-Sheet 1

Inventor:
Norman C. Bremer
By: [signature]
Atty.

Feb. 2, 1954 N. C. BREMER 2,667,791

SILENT CHAIN

Filed Dec. 23, 1950 7 Sheets-Sheet 2

Inventor:
Norman C. Bremer
By: Edward C. Gritzbaugh Atty.

Inventor:
Norman C. Bremer
By: [signature] Atty.

Feb. 2, 1954 N. C. BREMER 2,667,791

SILENT CHAIN

Filed Dec. 23, 1950 7 Sheets-Sheet 4

Inventor:
Norman C. Bremer
By Edward C. Fitzgerald
Atty.

Feb. 2, 1954 N. C. BREMER 2,667,791

SILENT CHAIN

Filed Dec. 23, 1950 7 Sheets-Sheet 5

Inventor:
Norman C. Bremer
By: Edward C. Fitzgerald
Atty.

Feb. 2, 1954
N. C. BREMER
2,667,791

SILENT CHAIN

Filed Dec. 23, 1950
7 Sheets-Sheet 6

Inventor:
Norman C. Bremer
By: Edward C. Fitzhugh
Atty.

Inventor:
Norman C. Bremer
By: Edward C. Fitzgerald
Atty.

Patented Feb. 2, 1954 2,667,791

UNITED STATES PATENT OFFICE 2,667,791

SILENT CHAIN

Norman C. Bremer, Ithaca, N. Y., assignor to Morse Chain Company, Ithaca, N. Y., a corporation of New York Application December 23, 1950, Serial No. 202,545

12 Claims. (Cl. 74—245)

This invention relates in general to a silent type of chain and more particularly to silent chains employed for timing drives on automotive vehicle engines.

Otherwise stated, the invention is embodied generally, in chain drives, and particularly to that type of chair drive wherein the chain is comprised of a series of toothed links connected by pivot pins, and is directed particularly to improvements in the joints thereof.

More specifically stated, it is a general object and accomplishment of the invention to provide improvements in the inverted tooth or silent type of silent transmission chains which makes possible true tangential engagement to and from the sprocket teeth, thus eliminating the chordal speed changes usually associated with chains of this type.

One of the major problems in connection with chain drives of this character is that of controlling chain stretch or pitch elongation caused by wear of the joints or pintles and mating apertures in the chain links.

In general, it may be stated that most all of the conventional timing chains contain some sort of articulating joint, the purpose of which is to permit the chain to flex around the sprockets.

Some of these chains employ a circular pin with mating round holes; others use segmental bushings or liners with a round pin; and still others employ rocking elements to reduce frictional loss and heating.

Accordingly, the paramount purpose of this invention is to provide a chain joint of the rocking type so designed that the areas which control the pitch or longitudinal spacing of the chain links is not affected by the wear which occurs on the joint elements during chain articulation. Otherwise stated, the areas of contact between the rocking surfaces and the chain joint which function during chain flexing or articulation are separate and remote from the areas of contact which function when the chain is straight. Consequently, increase in spacing between the joints caused by chain joint wear is apparent only when the chain is on the sprocket and while this contributes somewhat to apparent change in spacing between the sprockets, this change is not nearly as much as would be the case if the joint wear caused by articulation actually caused an increase in spacing between the joints in the straight portions of the chain.

It is important to understand that maintenance of a relatively tight chain over a long period of operation on automotive timing drives has been a long sought for need in the industry.

An important feature of the invention is the provision of a silent chain wherein the joint design is such that the chain has a stiff back or is of the non-back-bend type and cannot flex backwards but can flex forwards. To maintain this anti-whipping feature requires that the surfaces in the joint which permit bending backwards are not subject to wear by articulation. This requirement is advantageously fulfilled in the subject chain joint.

Another important feature and accomplishment of the invention is to provide in a silent chain a joint which incorporates correctional pitch elongating characteristics which compensates for chordal speed change due to sprocket action.

In this connection, it is important to understand that the ordinary chain, when running onto a sprocket, does not meet it exactly tangentially, but engages a sprocket tooth somewhat before the point of tangency and is then carried slightly upward and over the top of the sprocket before it settles into final engagement and is carried down around the sprocket. While the up and down motion thus transmitted to the free chain is very slight, yet it is periodic in character, occurring with each tooth, and may build up objectionable vibrations and noise. It is, therefore, desirable both theoretically and practically, to make a chain which will travel more truly on a straight line during the process of engagement with the sprocket tooth; so that whatever the motions given the parts in contact with the sprocket, the free portions of the chain will receive merely a straight line pull.

Another important purpose of the present invention is to control the action of the bearing and wearing surfaces as to regulate wear.

Another object and accomplishment of the invention is the provision of an improved arrangement whereby the chain has limited and controlled articulation.

Another important object of the invention is to improve the kinematic action of the joint by providing a more gradual transition from straight to rotary motion as the chain engages the sprocket and thus provide a quiet and smooth running timing chain.

It is another important object and accomplishment of the invention to provide an automotive timing chain which will run onto or mesh with a sprocket, having few teeth, under driving tension without any joint articulation occurring until the chain actually starts to partake of the angular motion of the sprocket and with the linear velocity of the chain coinciding with the angular velocity of the sprocket, thereby materially lessening the shock of meshing and the tendency to wear the driving teeth and resulting in smoother and more quiet operation.

More specifically stated, it is a further object and accomplishment of the invention to direct and control the motion of the driving joint picked up by the sprocket tooth as the chain engages the sprocket, so that it is carried inwardly toward the sprocket in the initial stages of engagement to offset the normal outward motion, with the result that the chain in going from the straight run to run over the sprocket takes a form more nearly curved than polygonal, whereby whipping is reduced and the shortening effect thereof upon the effective life of the chain is minimized.

An ancillary object and accomplishment of the invention is to provide a new and improved automotive timing chain assembly which is adapted to be economically manufactured and which is so designed as to permit the manufacture and assembly thereof in accordance with present day large scale mass production manufacturing methods of construction and assembly.

The invention seeks, as a final object and accomplishment, to provide an automotive timing chain assembly particularly characterized by a design arrangement to more advantageously and satisfactorily perform the functions required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner as hereinafter more fully described, and as more particularly pointed out in the appended claims.

Embodiments of the invention are illustrated in the accompanying drawings forming a part hereof and wherein.

Figure 11:
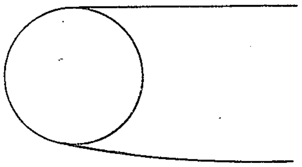
Figure 13:
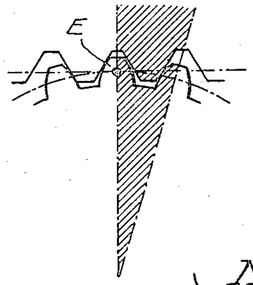
Figure 12:
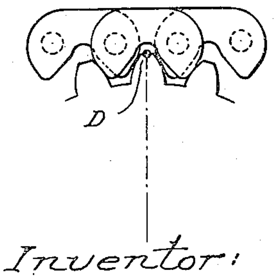
Figure 14:
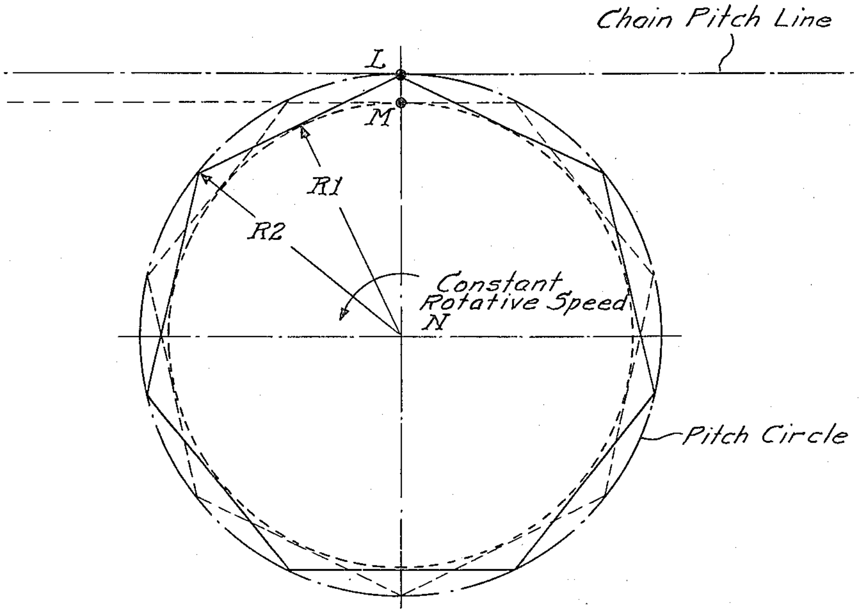
Figure 15:
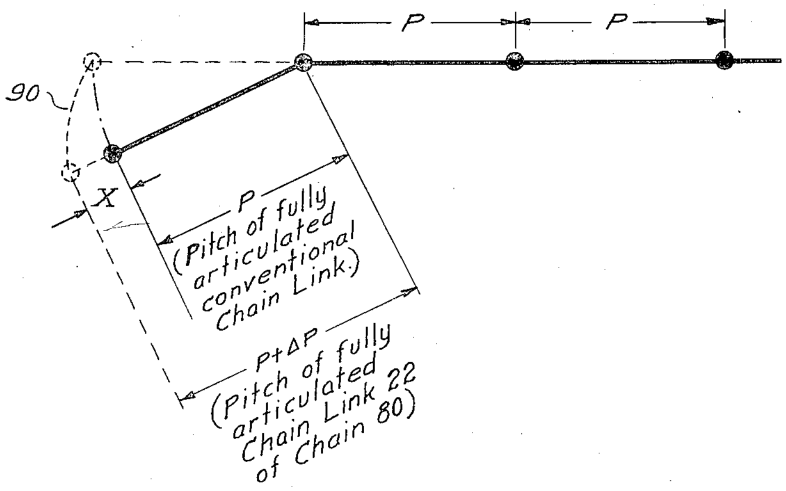
Figure 16:
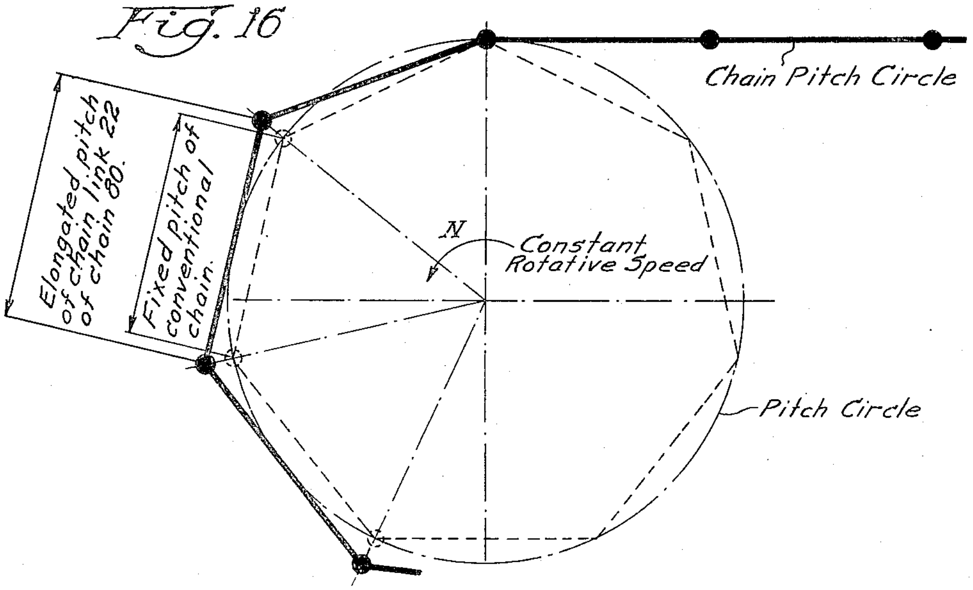
Figure 17:
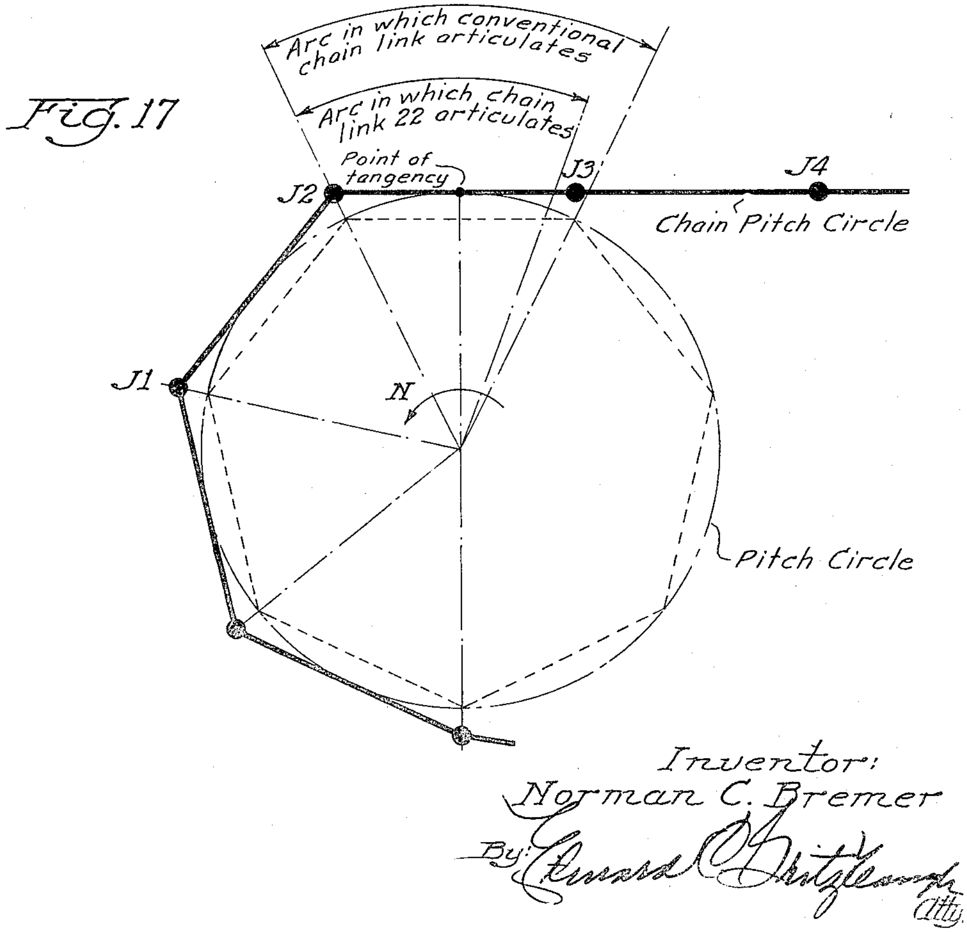
Figures 18, 19:
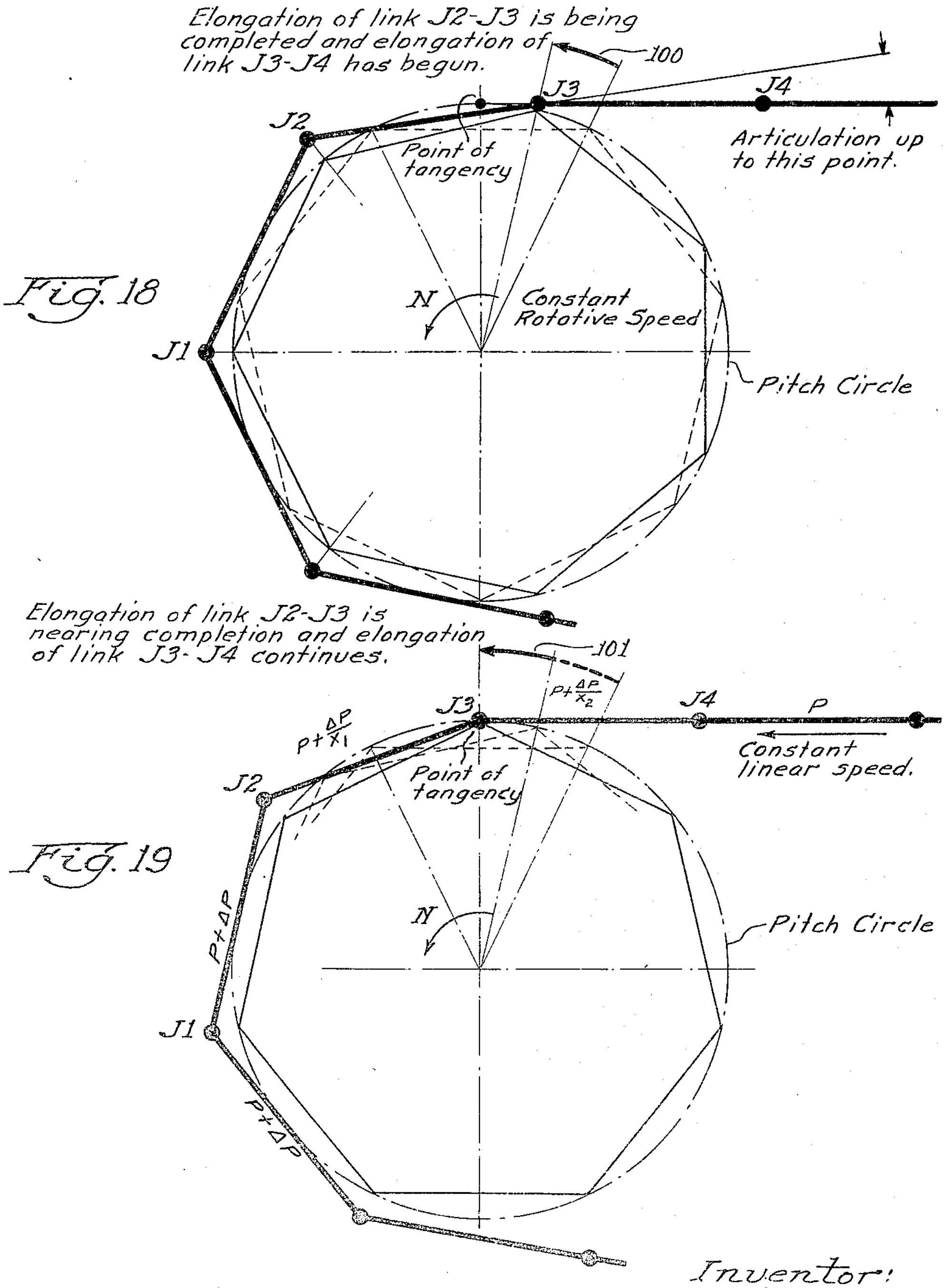
Figures 20, 21:
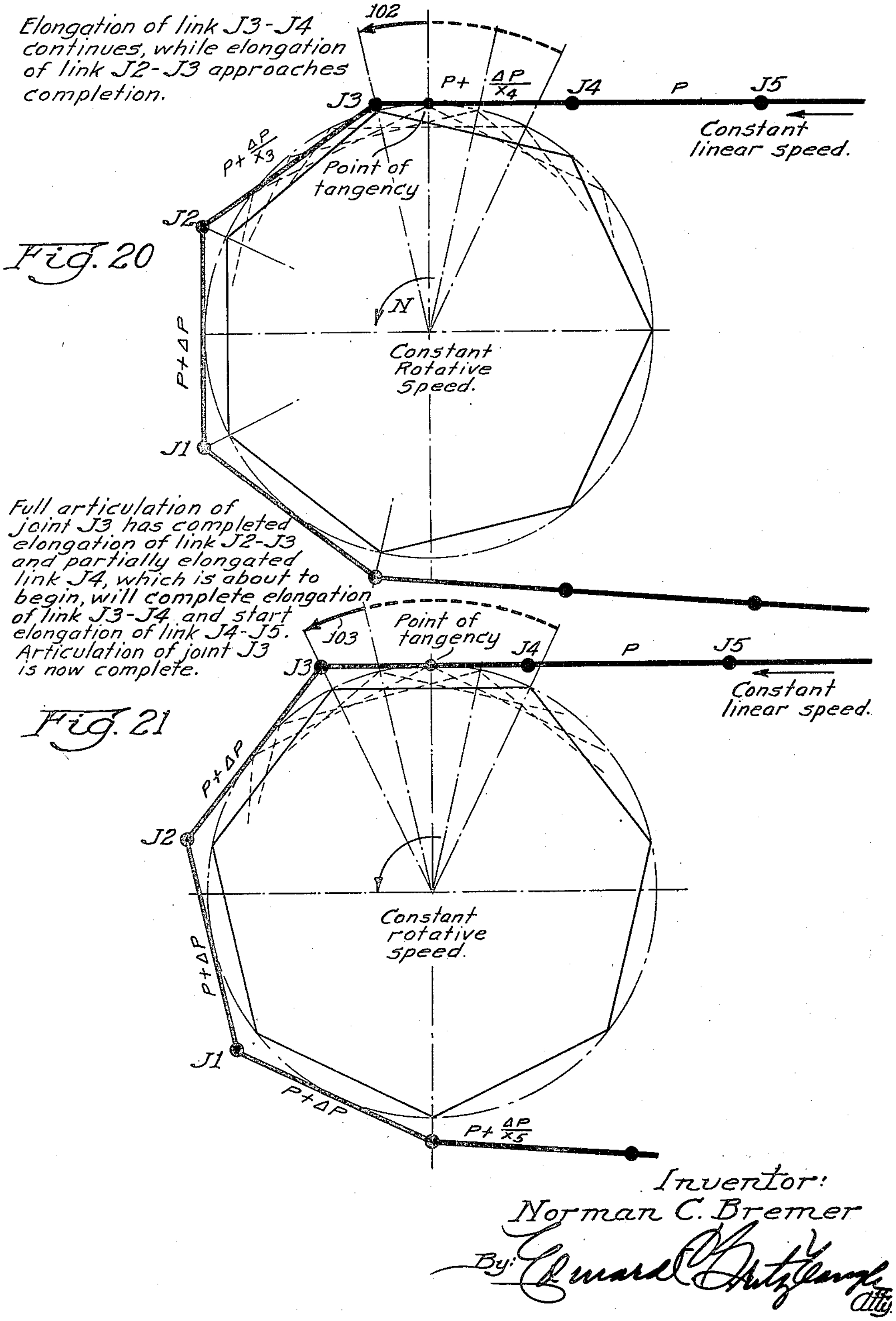

Fig. 11 graphically illustrates a belt engaging a smooth pulley which imparts the action desired in silent chain applications;

Fig. 12 diagrammatically illustrates the chain constructed as a rack and the sprocket as a gear in order to give true constant chain action;

Fig. 13 graphically illustrates the mechanics of a gear in engagement with a rack;

Fig. 14 diagrammatically illustrates the relative disposition of the pitch circle and the chain pitch line when employing the instant chain;

Fig. 15 diagrammatically illustrates in linear form the characteristics and degree of elongation of the instant chain when being wrapped upon a sprocket;

Fig. 16 diagrammatically illustrates the relative disposition of the pitch circle and the chain pitch line and illustrating the degree of elongation of the chain when being wrapped upon a sprocket;

Fig. 17 diagrammatically illustrates the relative disposition of the chain pitch line with respect to the pitch circle just before articulation of the chain takes place;

Fig. 18 is a continuation of the showing of Fig. 23 with the sprocket rotated slightly to illustrate initial articulation taking place;

Fig. 19 is a continuation of Fig. 18 showing the sprocket rotated further with articulation nearing completion;

Fig. 20 is a continuation of Fig. 19 showing the articulation and elongation of the chain link completed with initial articulation beginning at the joint of the next link following; and Fig. 21 is a continuation of Fig. 20 showing the complete articulation and elongation of two links with initial articulation taking place in the third link.

The drawings are to be understood to be more or less of a schematic character for the purpose of illustrating and disclosing a typical or preferred form of the improvements contemplated herein and in the drawings like reference characters identify the same parts in the several views.

In the exemplary embodiment of the invention depicted in Figs. 1, 2, 3, 4, 5 and 7, the new and improved chain joint with which the invention is particularly concerned and indicated in its entirety by the numeral 20, when employed with the rack shaped sprocket 21 and a chain link indicated in its entirety by the numeral 22 and having gear type teeth 23 and 24, is of such a design that as flexure takes place the pitch of the chain actually elongates. This is accomplished by the novel action of the contemplated chain joint 20 which comprises a single pin 30 having an arcuate periphery 31 with a relatively flat bearing surface 32, said chain link 22 having a generally semi-circular pin receiving aperture 33 with an arcuate bearing surface 34 in confronting relationship with respect to the bearing surface 32 of the joint pin 30.

Figure 2:
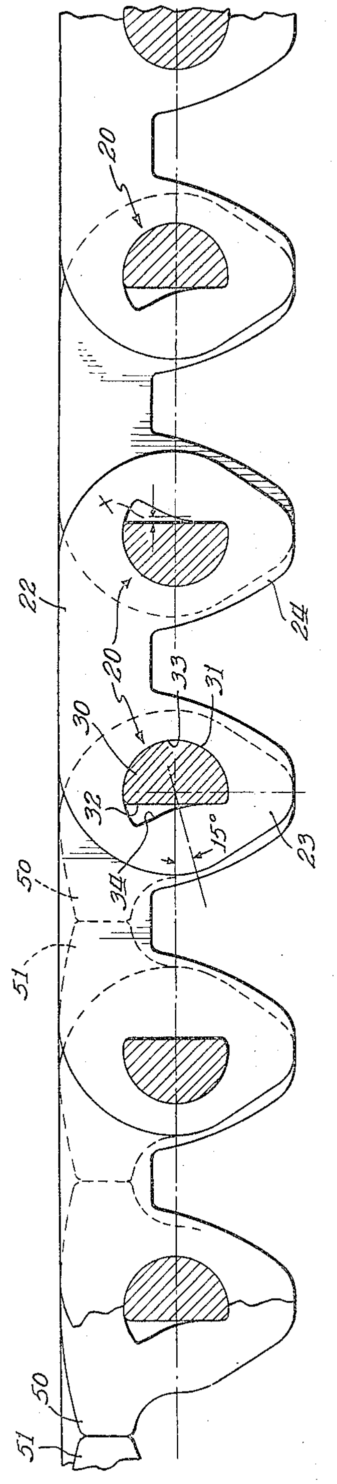
Fig. 2 is a side elevational view of the chain links of the chain depicted in Fig. 1, and with the joints or pintles thereof shown in section, this view being taken substantially on the plane of the line 2—2 in Fig. 1.

As can best be seen in Fig. 2 the arcuate bearing surface 34 of the chain link 22 is tilted in such a manner that the contact between the bearing surface 32 and the rocker-like bearing surface 34, when the chain is in its straight line pull as shown in Fig. 2, is at a point considerably below the center line of the chain. As the chain joint flexes the contact point moves upward due to the rocker-like action and the pitch of the chain elongates (Figs. 14 through 21), the amount of pitch elongation being calculated to just equal the pitch elongation that is necessary to wrap the chain upon the sprocket.

Figures 3, 4, 5:
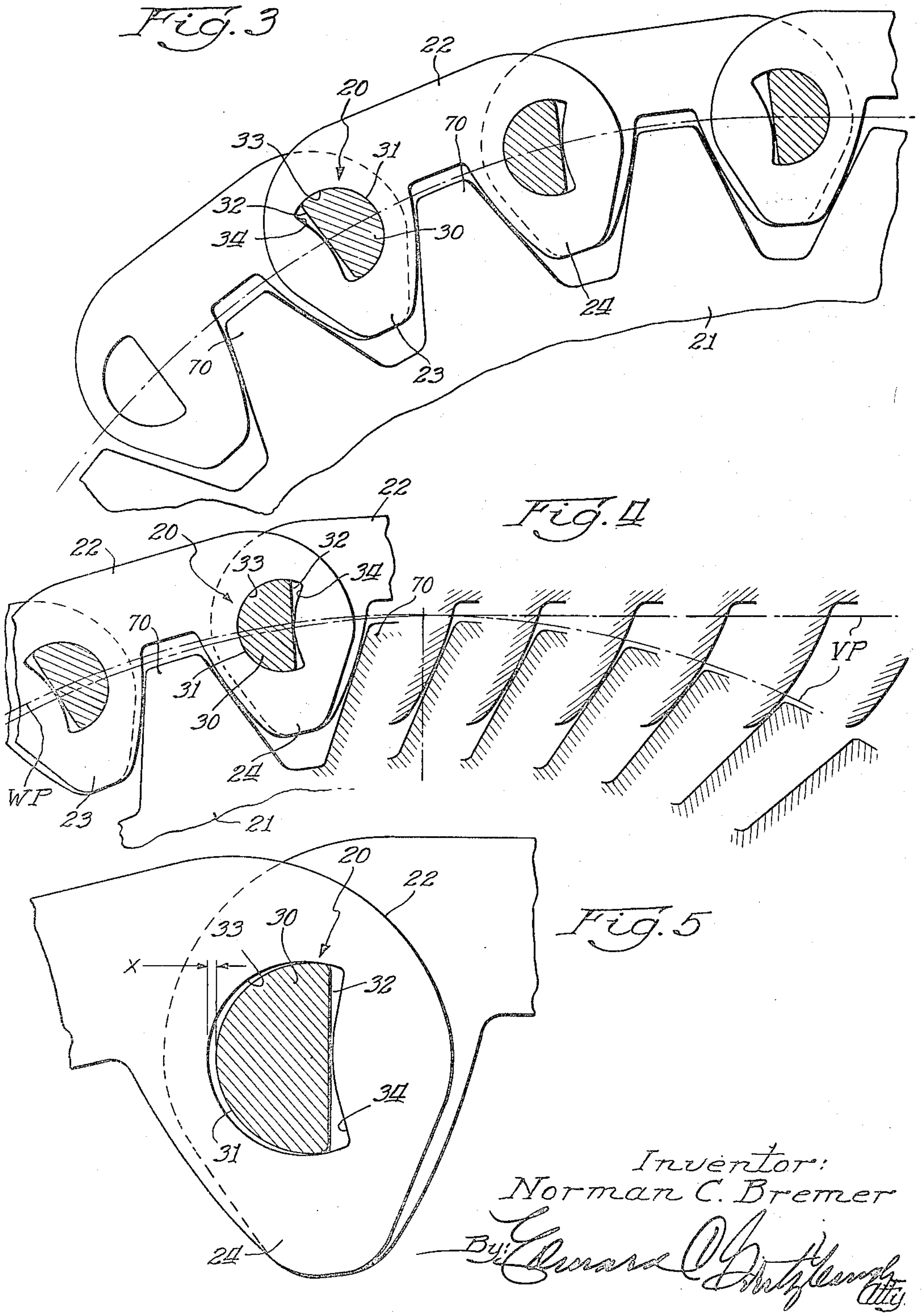
Fig. 3 depicts a chain embodying the features of the present invention and defines the relative movement of the chain after articulation has taken place and the chain is being wrapped upon the sprocket.
Fig. 4 is a diagrammatic view of the chain contemplated by this invention and illustrating the tooth action.
Fig. 5 is an enlarged fragmentary view of the chain joint illustrating the relative position of the pintle with respect to the adjacent portions of the link when the chain is in its flexed position.

In Fig. 2 the joint 20 comprising the pin 30 is shown in a position which corresponds to the straight or pulling position of the chain. In Figs. 3, 4 and 5 the joint 30 is illustrated in a flexed position to the amount necessary to wrap the chain around the sprocket teeth. The distance X in Figs. 2 and 5 is the amount that the joint increases the pitch of the chain as it wraps upon the sprocket.

It will be noted that the angular displacement of the arcuate bearing surface 34 with respect to the longitudinal pitch line will determine the minimum number of sprocket teeth with which the chain can be employed. In the drawings, the rocker-like arcuate bearing surface 34 has been tilted 15 degrees making a total angular movement of 15 degrees possible before the chain has reached its maximum pitch. This will limit the number of teeth upon which the correction will occur to 25 teeth because 360 degrees over 25 degrees equals 14 plus degrees. Furthermore, it is possible to design this chain so that a smaller number of sprocket teeth can be advantageously employed, merely by tilting the rocker-like bearing surface 34 more than shown.

Thus, it can be seen that the point of contact of the surface of the rocker-like arcuate bearing surface 34 and the relatively flat confronting surface 32 is in a different position well below the center line of the chain when the chain is in a straight line position as shown in Fig. 2 and that the point of contact changes upon flexure of the chain as shown in Figs. 3, 4 and 5. This action presents two wearing surfaces at different points. The first wearing surface being well below the center pitch line of the chain when the chain is in its straight line position as illustrated in Fig. 2 and the second point of contact being upwardly along the arcuate bearing surface 34 during flexure of the chain links as shown in Figs. 3, 4 and 5.

It is highly desirable in timing chains of the character contemplated herein to maintain a relatively tight chain so as to minimize vibrations. It has been proven that most of the objectional chain wear occurs at the flexure points of the chain. Thus, it can be seen that if different points of contact can be maintained between the working parts of the chain joint during the straight line pull of the chain and the flexing action of the chain when being wrapped upon the sprocket, the result will substantially increase the effective life of the chain and provide freedom from vibration and the resultant noise accompanying vibrations of the chain.

Therefore, it is apparent that the instant chain joint is of the rocking type and is so designed that the areas which control the pitch or longitudinal spacing of the chain links is not affected by the wear which occurs on the joint elements during chain articulation. Otherwise stated, the areas of contact between the rocking surfaces and the chain joint which function during chain flexing or articulation are separate and remote from the areas of contact which function when the chain is straight as shown in Fig. 2. Consequently, increase in spacing between the joints caused by chain joint wear is apparent only when the chain is on the sprocket and in such a situation elongation due to chain wear is of no import since the contacting surfaces of the chain teeth with the chain sprocket will regulate their relative disposition. However, it is important that no wear of the contacting surfaces be present when the chain is in its straight line pull as shown in Fig. 2 because any wear under these circumstances would cause objectionable pitch elongation of the chain with the result of vibration and noise in operation.

Particular attention is directed to the fact that the joint design is such that the chain has a stiff back or is of the non-back-bend type and cannot flex backwards but can flex forwards. To maintain this anti-whipping feature requires that the surfaces in the joint which prevent bending backwards are not subject to wear by articulation.

This is advantageously accomplished in the present invention by having the arcuate periphery 31 of the pin 30 in engagement with portions of the generally semi-circular pin receiving aperture 33 and with portions of the flat bearing surface 32 in engagement with portions of the arcuate bearing surface 34 particularly when the chain is positioned in a straight line pull as shown in Fig. 2 thereby to provide a locking action with these parts effective to cooperate with links 45, 46, 47 and 48 (Figs. 1 and 2) each of which is provided at each end thereof with a projection as at 50 adapted for engagement with an adjacent projection 51 of an adjacent chain link of similar construction thereby to further restrict movement of the chain outwardly of its straight line position but permitting movement of the chain inwardly of its straight line so that it may be wrapped upon a sprocket for driving relationship therewith.

Because the instant chain provides two effective bearing surfaces, one for the straight line pull of the chain and one for the articulation action of the chain, relatively little wear will be indicated in the first-mentioned bearing surface thus providing the important feature of maintenance of the anti-whipping feature since the requirement, that the surfaces in the joint which prevent bending backwards be not subject to wear by articulation, is advantageously fulfilled.

Having thus generally described the structural features of the instant chain, it is felt important to discus the general theory of operation to effectively define the coaction of the various elements of the instant chain in accomplishing its novel operational characteristics.

Heretofore, it has been axiomatic that the engagement of a series of jointed links for a chain when in engagement with a wheel or sprocket that is being rotated at a constant velocity must create at some portion of the cycle a change in linear velocity of the chain.

Figure 8:
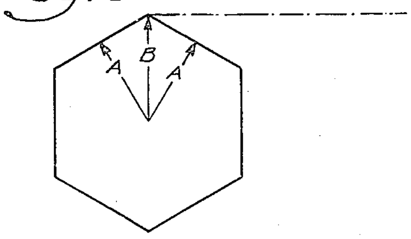
Fig. 8 illustrates a polygon figure to diagrammatically define the action of a conventional chain upon a conventional sprocket.

The speed characteristic of a usual type of conventional roller or silent chain engaging a tooth wheel or sprocket is almost identical to that of a steel tape which would be driving or be driven by a polygon shaped wheel as shown in Fig. 8.

The speed characteristics of this system might be described graphically as shown in Fig. 8. A tape at one instant is moving at a velocity described by radius A, then accelerates until it is moving at a rate equal to radius B, then decelerates to A again.

Figure 10:
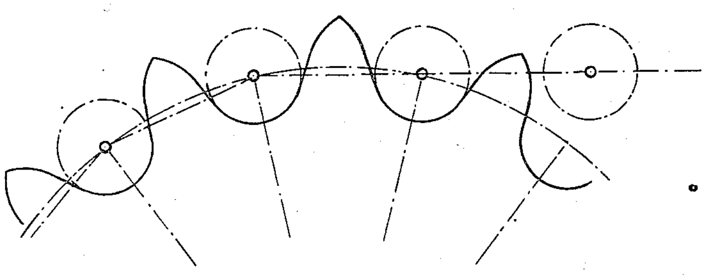
Fig. 10 illustrates the action of a conventional roller and/or silent chain when wrapped upon a conventional sprocket.

The action of a roller or silent chain might be shown as illustrated in Fig. 10. It will be noted that the change of velocity occurs with the chain when the major portion of the load is being transmitted to or from the sprocket teeth. This chordal action or, as it is sometimes described, chordal rise and fall of the chain, sets up not only impact stresses in the chain parts due to the hammer blow action of the links but also because of the rapid variation in the velocity of the chain which is being resisted by the inertia of the driving or driven masses create severe pulsating and rapidly recurring tensile stresses in the links of the chain. These loadings seriously reduce the effective transmissibility of the power in the chain and, if not offset by sufficient added strength in the chain, will result in fatigue failure of the parts.

Many attempts have been made to compensate or neutralize the effect of chordal action. The invention contemplates making the links of the chain of a curved form which in action would simulate the action of a gear engaging a rack. It has been found that such measures are quite effective, and when applied to chain drives, result in quieter operation and a marked increase in the chain power transmitting ability due to the lessened speed changes or velocity pulses in the strand of the chain between the sprockets.

In general, I propose to generate the working surfaces of the chain tooth with respect to the working surfaces of the sprocket tooth, so that as one rotates into and out of engagement with the other, the surfaces are conjugate one to the other. The result is a chain drive having chain teeth and sprocket teeth in driving relation one with the other, wherein, instead of having two or more or less flat surfaces moving into contact with one another along generally normal lines and thereby setting vibrations and noise by impact, I will have opposed curved surfaces coming into contact one with the other with a combined rolling and sliding action.

This further results in a chain sprocket drive wherein, by the inter-relation between these conjugate surfaces (Fig. 4), the chain tends to enter and leave contact with the sprocket along a line tangent to the pitch circle, instead of approaching along a line other than the tangent and seeking the pitch circle as contact takes place.

Graphically, the action that is always desired may be that of a belt engaging a smooth pulley as shown in Fig. 11. As stated hereinbefore, prior chains were constructed so that at some portion of the cycle of a chain engaging a sprocket there was a change in velocity, consequently the Utopian condition shown in Fig. 11 could not be realized. It is possible, however, to construct the chain as a gear and the sprocket as a rack and get true constant chain action if the chain is allowed to travel in a straight line as illustrated in Fig. 12.

Any attempt, however, to flex the chain after it leaves point D around the curved portion of the sprocket is bound to result in a variation in the velocity of the chain during the time that the joint is flexing or articulating. The amount of change in velocity, of course, is directly proportionate to the pitch of the chain.

The mechanics of a gear in engagement with a rack are such that actual transfer of pressure or energy is during a portion of the cycle shown by the shaded portion in Fig. 13.

Properly to develop a chain and sprocket combination which would similate a gear rack action, it is necessary that contact with the chain occur at points at either side of the tangent point E as shown in Fig. 13. From this, it will be understood that a chain link having a gear form and in engagement with a rack shaped sprocket must be of a form and of such dimension that contact with the sprocket teeth occurs considerably ahead of the actual tangency point of the sprocket and chain.

A study of the action of a chain and sprocket of such design revealed that the velocity of the chain remains constant for exactly half of the period of joint articulation, this being the portion of the cycle when the chain is approaching the tangency of the sprocket. During this time, the actual effective radius of the sprocket changes; the largest effective radius being at the instant of engagement, the minimum effective radius being when the joint has articulated one-half of its normal cycle. This change in effective radius is the reason that a chain contemplated by this invention does not exhibit the characteristic chordal action and behaves more like a gear with true linear velocity characteristics.

Figure 9:
Fig. 9 illustrates in graphic form the sine line imparted by the action of a conventional chain being wrapped upon a conventional sprocket.

As has been hereinbefore stated, one of the undesirable characteristics of silent chains in use prior to this invention is known in the art as chordal action, and this condition is effectively overcome by the teachings of this invention. A chain which approaches a sprocket along a path other than the line tangent to the pitch circle is finally forced into general conformity with the pitch circle by contact with sprocket teeth and the transverse movement of individual links resulting therefrom is transmitted to the approaching link, thus causing their paths of approach to the sprockets to be a wave something like a sine wave illustrated in Fig. 9. This chordal action gives the chain a varying linear velocity together with transverse motion. Chordal action may be easier to visualize if we consider the reverse condition of rolling a sprocket, which is equivalent to the pitch polygon illustrated in Fig. 8, on a plane surface. The axis of the sprocket would then have the wave motion which is normally imparted to the chain. Mathematically, the amplitude of the transverse motion of the earlier form of chain is equal to the versed sine of the angle 180 degrees divided by the number of teeth in the sprocket.

Chains made in accordance with this invention using conjugate working surfaces coupled with the novel action of the instant pitch elongating chain joint have none of these undesirable characteristics. Its entrance onto a sprocket is substantially along a line tangent to the pitch circle so that its linear velocity in substantially uniform, and transverse motion is absent. Noise due to impact is therefore reduced and internal stresses set up in the links are reduced to a minimum.

At the time that the chain has reached its point of tangency as shown in Fig. 4, articulation has not been completed and to fully flex the joint and wrap the sprocket, the link must assume a position with respect to the sprocket teeth which places the pitch point of the chain again at the point of largest effective radius. It is this portion of the time which is between the points of tangency and the time at which the chain is fully wrapped that the speed change hereinbefore discussed actually occurs.

It might be said that there are two effective pitch circles in a chain and sprocket combination of this type, one being the actual velocity of the chain, the other being the wrapped pitch of the chain on the sprocket, the latter being the larger. This is shown in Fig. 4 with the minor or velocity pitch being shown as VP and the major or wrapped pitch being WP.

The conjugate action of the instant chain (Fig. 4) coupled with the instant specifically designed pintle 30 and their combined coaction as taught by this invention is the means of accomplishing the change in effective chain and sprocket pitch in an automotive timing chain of the silent or inverted tooth type while accomplishing all of the other desirable objectives in obtaining true tangential approach and departure to and from the sprocket.

It will be understood that if a chain were made with joint parts or pintles having practically zero clearance, the change in pitch which has been hereinbefore described could not take place. Otherwise stated, if the chain and sprocket were designed of proportions such as to acquire the true gear action and with minimum joint clearance it would be found that the chain would not wrap the sprocket because of the increase in effective pitch diameter of the chain when wrapped and the resulting greater chordal distance between the chain joints.

Heretofore, it has been necessary to compromise on the design of all chains having minimum joint clearance. In other words, the sprocket has been merely cut to a smaller pitch diameter which will allow the chain to wrap, but in doing so, the true desired action is lost and some chordal effect is experienced.

If, after the midway point of joint flexure has been reached, the chain is made to increase in pitch or distance between the joints during the rest of the joint flexure as contemplated by this invention, the desirable condition of a true gear rack combination and suitable chain sprocket wrapping characteristics are obtained.

In this invention the new and improved chain joint 20 employed in combination with the rack type sprocket 21 and a gear-shaped chain link 22 is of such a design that as flexure takes place the pitch of the chain actually elongates. This is accomplished by means of the contemplated chain joint in which a pin 30 having a flat bearing surface 32 in contact with a rocker-like bearing surface 34 comprises the chain joint 20 as shown in Figs. 1, 2, 3, 4 and 5. The rocker-like curved bearing surface 34 is tilted in such a manner that the contact between this curved surface and the flat surface 32 of the pin is at a point considerably below the original line of the chain where the chain is in the straight line position as shown in Fig. 2. As the chain joint flexes the contact point moves upward due to the rocker-like action and thereafter the pitch of the chain progressively elongates (Figs. 14 through 21), the amount of pitch elongation being calculated to just equal the pitch elongation that is necessary to wrap the chain upon the sprocket.

Figure 1:
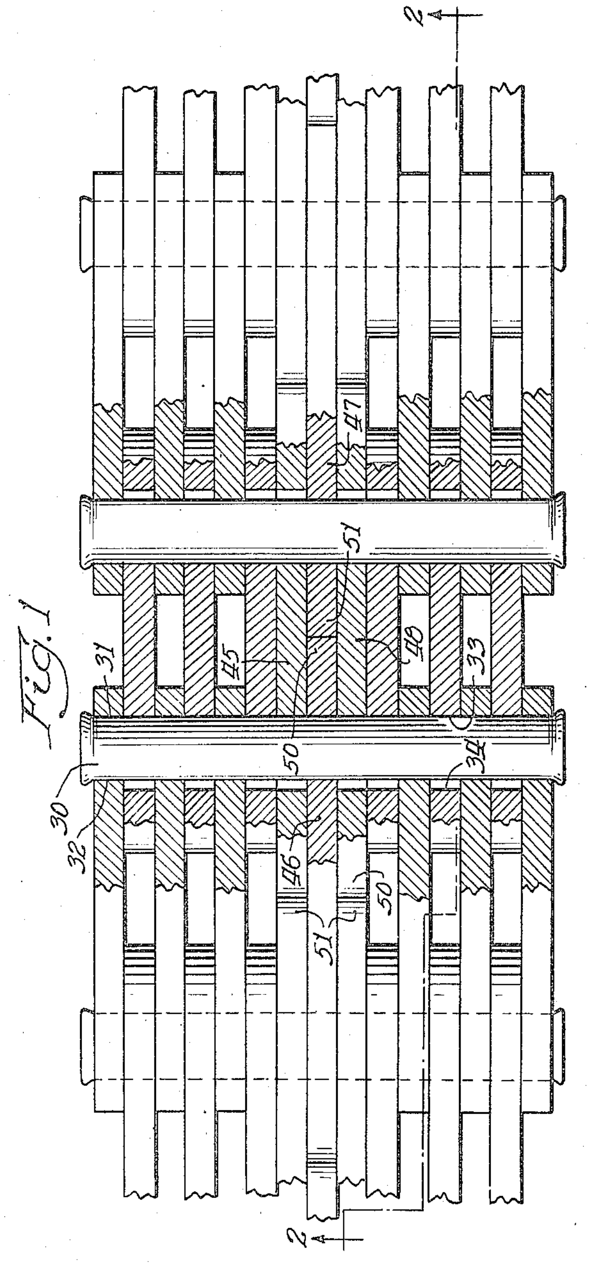
Fig. 1 is a top plan view of an automotive timing chain embodying the features of the present invention and with portions thereof shown in section to more clearly illustrate the construction thereof.

In Fig. 2 the joint 20 comprising the pin 30 is shown in a position which corresponds to the straight or pulling position of the chain. In Figs. 3, 4 and 5 the joint 20 is illustrated in a flexed position to the amount necessary to wrap the chain around the sprocket teeth. The distance X in Figs. 1 and 5 is the amount that the joint increases the pitch of the chain as it wraps upon the sprocket.

Also, within the spirit of this invention is the combination of the pitch elongating joint as hereinbefore described and a link having straight sided tooth engaging surfaces and a sprocket engaging the chain having curved teeth, the effect of which could be made to be the same as that of the disclosed curved chain teeth 23 and 24 when employed with a sprocket as at 21 having straight-sided teeth.

Figures 6, 7:
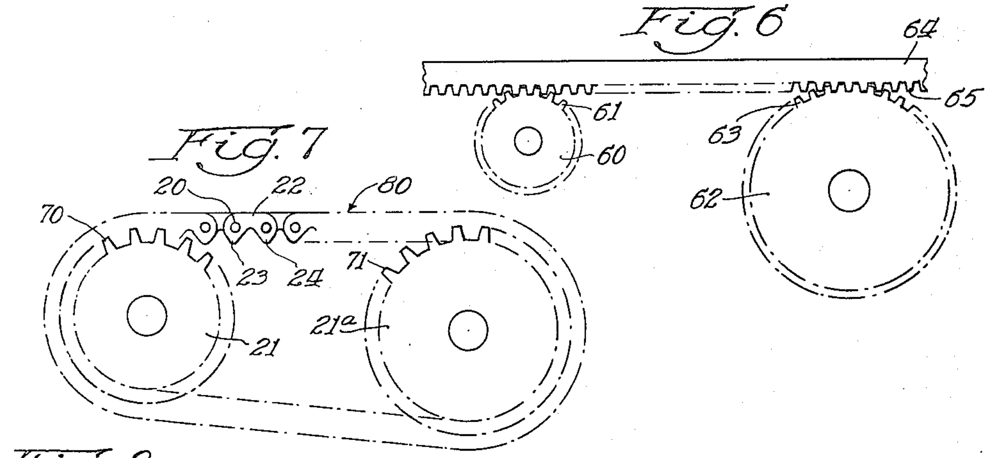
Fig. 6 illustrates a pair of sprockets of different diameter operatively associated with a rack to depict an ideal chain action.
Fig. 7 shows a driving sprocket, a driven sprocket and an endless chain cooperating therewith.

Referring to Fig. 6, there is shown a driving sprocket 60 having teeth 61, a driven sprocket 62 having teeth 63, and a rack 64 of infinite length having teeth 65 cooperating with teeth 61 and 63. It is well known that substantially uniform rotation may be transmitted from the driving sprocket 60 to the driven sprocket 62 if the involute system of gear cutting is used. By this system, teeth 61 and 63 of sprockets 60 and 62 are made straight sided with a predetermined pressure angle, and the teeth 23 and 24 of the chain link 22 are then cut from a hob having a profile of the sprocket teeth. If the rack 64 is of infinite length, the driving sprocket 60 can drive driven sprocket 62 as long as is desired.

Attention is now directed to Fig. 7 wherein there is shown the sprocket 21, which may be considered the driving sprocket, and a driven sprocket 21*a* having teeth 70 and 71 respectively. Wrapped around both sprockets is an endless chain 80 which is comprised of a plurality of individual links as at 22 having teeth 23 and 24 on the inner surface thereof, and connected together by means of pins indicated in their entirety by the numeral 20. It is obvious that the portion of the chain 80 located between the sprockets and commonly called the strand, resembles rack 64 illustrated in Fig. 6.

Attention is now directed to Figs. 14 through 21 wherein the pitch circle illustrated may be defined as a function of the sprocket and the chain, and remains constant at all times for any given set of conditions. The pitch circle defines a circle whose center is the axis of rotation of the sprocket and whose periphery circumscribes a polygon whose sides are equal to the pitch of the chain and the number of whose sides equals the number of teeth in the sprocket.

The pitch of the chain indicated as P is the distance between the pivot centers of the links. In the event of chain wear, or if it stretches under load or centrifugal force, the pitch P increases, thereby to reflect an increase in the diameter of the pitch circle; however, any change in the diameter of the pitch circle resulting from wear is a gradual change extending throughout the life of the chain while the change in the pitch diameter resulting from load upon the chain or from centrifugal force, remains constant or fixed for any given load and speed.

In this connection it is important to understand that there is no appreciable variation in the pitch circle diameter during normal operation and no fluctuation of the position of the pitch circle, along a tangent line to which the chain must enter and leave the sprocket during operation. Accordingly, as the pitch of the chain increases the individual links will ride further out in the sprocket teeth. Thus, it appears that the only result of an increase in the pitch or length of the chain is to cause the chain teeth to engage the sprocket farther out from the center, without any other change in tooth relationship.

In Figs. 4, 14 and 16 it can be seen that when a chain tooth as at 24 approaches a sprocket tooth as at 70 to which it is conjugate it is held up in position on the chain pitch line, which is the line tangent to the pitch circle, by contact with a sprocket tooth. Heretofore, conventional chain teeth engaging sprockets not employing the principles of conjugate action contemplated by this invention, will either lie inside or outside the profile of the generated surface. If it lies inside, the chain tooth will be so positioned as to locate the link pivot somewhere between the chain pitch line and the center of the sprocket at the time contact with the sprocket tooth is established. If the working surface lies outside the generated surface, the link pivot will be positioned somewhere beyond the tangent when sprocket contact is established. In either event this results in displacing the link pivot at one side or the other of the pitch circle and normal pitch line as the chain enters the sprocket and subsequently conforms to the pitch circle, thus the objectionable chordal action described hereinbefore is set up. This same reasoning applies to the chain leaving a sprocket. Moreover, in Fig. 14 there is diagrammatically illustrated the fluctuation of conventional chain and sprockets between the pitch circle and the normal pitch line.

It is deemed important for a clear understanding of the functions of the present invention to establish definitions of working surfaces of the chain links. By working surfaces, I mean those surfaces on the chain tooth and on the sprocket tooth which come together to establish a driving relation between the chain and sprocket. By inside contact, I mean a chain and sprocket relation wherein the working surfaces on the chain are not at the ends of the link but form the sides of the gap or pocket between the two teeth on the link, and wherein, therefore, the working surfaces on any chain link are not located beyond the pivot points of the link but between the link pivot points. Accordingly, the present invention teaches the construction of an inside contact link.

It is notable that the curves for the contact surface or surfaces of a link tooth obtained by the method herein described are conjugate to the original tooth form and the links have, with the sprocket teeth, the characteristic progressive rolling and sliding action, which affords the desired constant velocity conditions in both the driven and driving elements. The desired conditions for ideal drive assumed as a basis for the processes of generation are thus reproduced when a chain link having teeth designed after the manner herein described is operatively disposed on a sprocket having teeth of the form used for generation.

In Figs. 4, 14 through 21, it can be seen that chain and sprocket combinations made in accordance with this invention by the incorporation therein of the combined coaction of the specifically defined link joint as at 20 together with the generated conjugate tooth surfaces of the chain and sprocket, have certain highly desirable characteristics in that chordal action is practically eliminated, and the chain enters the sprocket with constant linear velocity for any given constant angular velocity of the sprocket.

The specific design of the chain pins 30 of the chain joint 20 permit no deviation from the pitch line upon entering the sprocket by reason of the aforesaid progressive contact action coacting with the action of the joint 20. This is clearly illustrated in Fig. 4 which indicates how the contact between the surfaces of the link and sprocket teeth holds the entering chain link in a position such that the points of initial articulation enter the sprocket on a line tangent to the pitch circle.

Elimination of chordal action results in a material reduction of the stresses set up in the link structure, affords extreme smoothness in operation and largely reduces noise.

The instant chain structure possesses another important characteristic in that impact between the links and sprocket upon engagement is substantially eliminated. This is due for the most part to the conjugate character of the contacting surfaces.

As can be seen in Fig. 4, when the link enters the sprocket, the paths traced by the contact points on both link and sprocket teeth 24 and 70, are practically coincident, and the initial contact is accordingly gradual and gentle and entirely lacking in impact characteristics.

Otherwise stated, the invention contemplates a chain joint as at 20 providing elongation of pitch only under certain circumstances, that is to say, when the chain is being wrapped upon the sprocket as illustrated in Figs. 14 through 21.

Attention is next directed to Figs. 14 through 21 wherein there is diagrammatically illustrated the relative reaction between the chain and sprocket contemplated by this invention.

In Fig. 14 it can be seen that in a conventional chain drive the point of tangency is constantly varying between points I and M. Otherwise stated, the effective radius is constantly varying between R1 and R2. In the chain contemplated between this invention the point of tangency is constant at point L and the effective radius remains constant at R2.

Mathematically speaking, in a conventional chain drive the linear speed of the chain pulsates. It is slower over the short radius and faster over the long radius. Also, the chain rises and falls over the varying radius. This may be calculated as follows:

$$V=2\pi RN$$

and R will always be variable.

In the chain contemplated by this invention the linear speed of the chain is constant because the effective radius is always the same. Also, chordal rise and fall are eliminated. This may be calculated as follows:

$$V=2\pi RN$$

and R is always constant.

Thus, it can be seen that constancy of effective radius results in a constant linear speed with no chordal rise and fall, this being accomplished by the combined reaction of the joint 20 coupled with the conjugate tooth profile of the chain and sprocket contemplated by this invention.

The principles of coaction of the instant chain and sprocket construction embraces a chain joint permitting gradual or progressive elongation of the pitch of the chain as it articulates in engaging the sprocket, this feature being diagrammatically illustrated in linear form in Fig. 15 where it can be seen that the pitch P of a fully articulated conventional chain link remains the same while the pitch of the fully articulated chain link 22 of the chain 80 progressively elongates as diagrammatically defined by the arc 90 (Fig. 15) to a distance X also shown in Figs. 1 and 5.

In order to accomplish this result and to provide for the elongated pitch contemplated by this invention, the instant chain wraps the sprocket outside the pitch circle as illustrated in Fig. 16 in full lines, while the conventional chain wraps the sprocket inside the pitch circle as indicated by the dotted lines. Thus, it can be seen that when the instant chain is fully articulated a line drawn through the centers of the joints will be tangent midway thereof with the pitch circle of the sprocket.

Since the instant chain, where it is engaged by the sprocket, is always tangent to the sprocket on the pitch circle, its articulation begins a few degrees later than that of a conventional chain as illustrated in Fig. 17.

For purposes of illustration in Figs. 17 through 21, the chain joint 20 has been indicated J1, J2, J3, J4 and J5. The relative disposition of these joints when being wrapped upon a sprocket will now be described in stages.

In Fig. 18 the sprocket, which rotates at a constant speed is shown moved forward a distance indicated by the arrow 100 and it can be seen that elongation of link J2—J3 is being completed and elongation of link J3—J4 has begun.

In Fig. 19 it can be seen that the sprocket has been rotated further a distance indicated by the arrow 101 and elongation of the link J2—J3 is nearing completion and elongation of link J3—J4 continues. The mathematical formulas for calculating the pitch of the respective links are indicated. Thus, it can be seen that prior elongation of link J2—J3, due to articulation of joint J2 maintains the point of tangency on the pitch circle and that elongation of the instant chain link maintains the chain at a constant linear speed when passing through the arc in which a conventional chain would normally be accelerating in speed.

In Fig. 20 the sprocket has been rotated forward at a distance indicated by the arrow 102 and elongation of link J3—J4 continues while elongation of link J2—J3 approaches completion. It also is important to note that elongation of link J2—J3 maintains a constant linear speed by holding link J3—J4 out to tangency at the pitch circle of the sprocket when passing through the arc in which a conventional chain would normally be decelerating in its speed.

Attention is now directed to Fig. 21 which shows the sprocket further rotated a distance indicated by the arrow 103 and that full articulation of joint J3 has completed elongation of link J2—J3 and has partially elongated link J3—J4, while articulation of joint J4 which is about to begin, will complete elongation of link J3—J4 and start elongation of link J4—J5. In the instant chain, pitch elongation of the chain as it is engaged by the sprocket is accomplished by the articulation of each joint in turn which is effective to maintain the point of tangency of the chain, as indicated, at the pitch circle of the sprocket, thus keeping the effective radius of the drive constant. Otherwise stated, constant effective radius plus constant rotative speeds equal constant linear speed.

Although the instant chain has been found advantageously applicable to the aforementioned class of service, it is understood that the instant chain can advantageously fulfill power transmission requirements in other applications wherever design requirements of the chain call for relatively high speed operation under relatively heavy load conditions.

A geometric study of prior art chain constructions indicated that the force creating the objectionable slipping tendency between contact points of pintles was caused by the fact that the radii of the curved joint surfaces did not always coincide with the line action of the chain. In other words, when the joint flexed and the rocker contact point shifted, the tangency points of the rockers were not perpendicular to the chain pitch line and thereby a vertical force component was generated which was equal to:

$$\tan \frac{360}{N} \times \text{chain pull}$$

In this connection attention is invited to Figs. 1, 2, 3, 4 and 5 which respectively show the relative disposition of the chain pins 30 in straight line and flexed conditions. In these views it can be seen that the tangency points of the rockers are always perpendicular to the chain pitch line regardless of the fact that the chain is in its straight line position or in its flexed position, thereby eliminating the vertical force component hereinbefore mentioned. For best operation, it is desirable that the tangency points between the flat bearing surface 32 and the curved bearing surface 34 be located at points ranging between those shown in Fig. 1 and Fig. 5 in which full flexure of the chain is shown and which is normally applicable when the instant chain is wrapped upon a sprocket.

A rocker joint as at 20 embodying a flat faced seat-pin as at 30 and a curved rocker like bearing surface as at 34 and employed in combination with an inside engagement driving link 22 having teeth 23 and 24 with the working surfaces thereof and the working surfaces of a mating sprocket being conjugate each with the other, is ideally adapted for automotive timing chain service because of the operational characteristics hereinbefore described.

The instant chain and the links thereof being formed of simple parts and readily available materials lends itself to mass production manufacturing principles, thus affording a substantial saving in the manufacturing costs.

From the foregoing disclosure, it may be observed that I have provided an improved automotive timing chain incorporating an improved chain joint cooperating with conjugate mating of teeth of the chain and sprocket to provide a chain which efficiently fulfills the objects thereof as hereinbefore stated and which provides numerous advantages which may be summarized as follows:

1. Structurally simple, efficient and durable;
2. Economical to manufacture and readily adaptable to mass production manufacturing principles; and
3. The provision of an improved automotive timing chain having structural features thereof effective to eliminate the heretofore objectionable chordal action thus to effectively increase the life of the chain.

While I have illustrated preferred embodiments of my invention, many modifications may be made without departing from the spirit of the invention, and I do not wish to be limited to the precise details of construction set forth but wish to avail myself of all changes within the scope of the appended claims.

I claim:

1. In a power transmission chain adapted to run on a toothed sprocket, the combination of successive articulated links, means cooperable with a portion of said link in a rocking-like motion for introducing a compensating action to provide positive progressive elongation of the pitch of the chain during the process of bending the chain in running on the sprocket whereby the polygonal action of the toothed sprocket is reduced, and means forming a part of said links and operable to prevent bending of the chain outwardly of its straight line position but permitting bending of the chain inwardly of its straight line position.

2. In combination, a sprocket, a jointed link chain adapted for use with the sprocket, there being a curved tooth at each end of each link, and each tooth of said link having a working surface generated for conjugate relationship with the teeth of the sprocket, and pintle means including a flat portion positively operable with a portion of said link and responsive to articulation of the jointed links when being wrapped upon a sprocket to prevent the chain during initial engagement with the sprocket from accelerating over the normal speed of the chain.

3. In combination, a sprocket and a chain comprising a plurality of articulated toothed links adapted for operative engagement with the sprocket teeth, the opposed working surfaces of the teeth of the chain and sprocket being conjugate one to the other, pivot pins arranged to provide progressive elongation of the pitch of the chain responsive to progressive articulation of the chain as the chain is wrapped upon the sprocket by cooperation with means forming part of said links and the conjugate action of the working surface of the teeth, and a second means forming a part of said links and operable to prevent bending of the chain outwardly of its straight line position but permitting bending of the chain inwardly of its straight line position.

4. In a chain comprising a plurality of links, pintles connecting said links, a curved bearing surface forming a part of the chain link, said pintles each having a flat bearing surface which is adapted to rock upon a curved bearing surface forming a part of the chain link thereby to provide progressive elongation of the pitch of the chain responsive to progressive articulation of the chain upon being wrapped on a sprocket.

5. In combination, a sprocket, and a link chain adapted for use with the sprocket, there being a curved tooth at each end of each link, and each tooth of said link having a working surface generated for conjugate relationship with the teeth of the sprocket, said link chain having pivot pins which include means cooperating with said link and arranged to provide progressive elongation of the pitch of the chain responsive to progressive articulation of the chain as the chain is wrapped upon the sprocket.

6. A sprocket having teeth generated from a hob having the toothed profile of a rack, a chain cooperating with the sprocket and comprising toothed links having a curved tooth profile generated from a hob having the general profile of the sprocket teeth, pivot pins connecting the links, said pins when wrapped upon a sprocket being located outside the pitch circle of the sprocket on a line passing through the pins and which is tangent to the pitch circle of the sprocket, said pivot pins including means arranged to provide progressive elongation of the chain pitch responsive to progressive articulation when being wrapped upon a sprocket thereby to compensate for the difference between the length of a chord equal to the distance between the pivot pins on a link and the arc said chord subtends, whereby substantially to eliminate velocity variations in the chain, and means forming a part of said links and operable to prevent bending of the chain outwardly of its straight line position but permitting bending of the chain inwardly of its straight line position.

7. In an automotive timing chain adapted to be run on a toothed sprocket, a plurality of link plates, a joint connecting said plates, said joint co-acting with said plates and including means arranged to provide progressive elongation of the pitch of the chain as the chain approaches the sprocket and is being wrapped thereon, and means forming a part of said link plates and cooperating with said joint for controlling back bending movement of the chain outwardly of its straight line position.

8. A link chain adapted for use with a sprocket, there being a curved tooth at each end of each link, and said link chain having pivot pins which have means arranged to cooperate with a curved surface on said link to provide progressive elongation of the pitch of the chain responsive to progressive articulation of the chain as the chain is wrapped upon a sprocket and arranged to cooperate with means forming a part of said links for controlling back bending movement of the chain outwardly of its straight line position.

9. An oscillating joint for chains comprising links adapted to be hinged together, said oscillating joint comprising a pin having a straight-sided bearing surface, and an arcuate bearing surface forming a part of said links and disposed tangent to said straight-sided bearing surface on said pin and whose center of curvature is on a line angularly disposed of the chain pitch line during the straight pull of the chain and with the center of curvature being movable radially outwardly to the center pitch line of the chain responsive to articulation of the chain, the curvatures of the arcuate bearing surface in relation to the straight-sided bearing surface being such as to provide progressive elongation of the pitch of the chain responsive to progressive articulation of the chain.

10. In a chain, the combination of a link having a pintle hole, a second link having a pintle hole, and a curved bearing surface forming an integral part of the pintle hole, a pivot pin extending through said holes to form a joint connecting the links, said pin having a straight bearing surface facing toward the curved bearing surface forming an integral part of the pintle hole, said straight bearing surface being arranged to rock on said curved bearing surface responsive to articulation of the chain, said rocker motion providing gradual elongation of the pitch of the chain during articulation, and the tangency points between the curved straight bearing surfaces always being on a line perpendicular to the pitch line of the chain.

11. In combination, a sprocket, a link chain adapted for use with the sprocket, there being a straight sided tooth at each end of each link, and each tooth of said sprocket having a working surface generated for conjugate relationship with the teeth of the chain link, said link chain having a pivot pin including a straight sided surface, and means defining a curved bearing surface respectively related to a link of said link chain and cooperable with said straight sided surface, the center of curvature of the curved bearing surface being on a line angularly disposed of the chain pitch line during straight pull of the chain and movable radially outward to the center line of the chain responsive to articulation of the chain thereby providing a progressive increment in length to the pitch of the chain responsive to progressive articulation of the chain as the chain is wrapped upon the sprocket.

12. In a chain, the combination of links each having a pair of pintle holes, pintle means extending through the pintle hole in one link and the pintle hole on an adjacent link to form a joint connecting the links, said pintle means havingfi a straight bearing surface, said pintle holes presenting a convex bearing surface, said convex bearing surface being arranged to cooperate in a tangential rocking motion on said straight bearing surface responsive to articulation of the chain, said rocking motion being free of sliding action and providing gradual elongation of the pitch of the chain during articulation, the tangency points between the convex bearing surface and the straight bearing surface holes being on a line perpendicular to the pitch line of the chain and moving gradually radially outward from a point radially inward of the pitch line of the chain during straight pull of the chain to a point on the center pitch line of the chain when full articulation of the chain is accomplished.

NORMAN C. BREMER.

References Cited in the file of this patent

UNITED STATES PATENTS

| Number | Name | Date |
|---|---|---|
| 1,692,799 | Sturtevant | Nov. 20, 1928 |
| 1,769,960 | Morse | July 8, 1930 |
| 1,887,137 | Morse | Nov. 8, 1932 |
| 1,919,768 | Brandt | July 25, 1933 |
| 2,030,829 | Belcher | Feb. 11, 1936 |
| 2,226,010 | Moorhouse | Dec. 24, 1940 |
| 2,413,843 | Perry | Jan. 7, 1947 |